(12) United States Patent
Lee

(10) Patent No.: US 7,397,914 B2
(45) Date of Patent: Jul. 8, 2008

(54) MULTIPLE PATH HYBRID FOR SUBSCRIBER LINE SERVICES

(75) Inventor: Kim Fung Lee, Fullerton, CA (US)

(73) Assignee: Silicon Laboratories, Inc., Austin, TX (US)

( * ) Notice: Subject to any disclaimer, the term of this patent is extended or adjusted under 35 U.S.C. 154(b) by 542 days.

(21) Appl. No.: 10/955,235

(22) Filed: Sep. 30, 2004

(65) Prior Publication Data

US 2006/0067517 A1 Mar. 30, 2006

(51) Int. Cl.
H04M 1/00 (2006.01)
H04M 9/00 (2006.01)
(52) U.S. Cl. ................... 379/402; 379/403; 379/390.04
(58) Field of Classification Search ............ 379/390.04, 379/402–405
See application file for complete search history.

(56) References Cited

U.S. PATENT DOCUMENTS 7,010,025 B1 * 3/2006 Helfenstein et al. ......... 375/219

* cited by examiner

*Primary Examiner*—Curtis Kuntz
*Assistant Examiner*—Alexander Jamal
(74) *Attorney, Agent, or Firm*—Davis & Associates; William D. Davis (57) ABSTRACT

A hybrid with a plurality of selectable hybrid input paths each having an associated hybrid input path filter is provided. The hybrid includes a plurality of selectable receive paths each having an associated receive path filter. The hybrid further includes a hybrid output. The selection of any filter is non-mutually exclusive to the concurrent selection of another filter.

29 Claims, 10 Drawing Sheets

*Prior Art*

MULTIPLE PATH HYBRID FOR SUBSCRIBER LINE SERVICES

FIELD OF THE INVENTION

This invention relates to the field of telecommunications. In particular, this invention is drawn to hybrid circuitry for performing receive/transmit path separation.

BACKGROUND

The plain old telephone system (POTS) was initially architected to carry voice data in analog form from one subscriber to another via configurable switches. Although the telephone network evolved to using a digital transport network (i.e., the Public Switched Telephone Network (PSTN)), communication on the subscriber line connecting subscribers to the central office that serves as the entry point to the PSTN is analog. The "last mile" between the subscriber and the central office was architected for analog communications in the voiceband frequency range.

Although modems were developed to enable communicating digital data using the same analog channel used to carry analog voice data, the digital data rates between the subscriber and central office were relatively low due to the constraints of operating exclusively within the voiceband region of the spectrum. Numerous communication protocol standards have since developed to enable using the POTS infrastructure for communicating digital data at higher data rates by utilizing communication bandwidth beyond the voiceband. For example, digital subscriber line (xDSL) services utilize communication bandwidth beyond and exclusive to the voiceband. As a result, xDSL services may co-exist with voiceband communications. Co-location of access to digital networks other than the PSTN at the central office enables leveraging the POTS infrastructure investment in the subscriber line.

The central offices may be retrofitted to permit sharing the subscriber line between multiple services such as voice and digital services. Typically this is accomplished by adding digital service specific linecards and a discrete component splitter for each subscriber line so that the subscriber line can be communicatively coupled to both the existing POTS linecard and the added digital service linecard. Although the splitter provides separation for services that utilize different frequency bands of the communication spectrum, a hybrid is usually required for providing transmit/receive path separation and echo cancellation for both the xDSL communications and the voiceband communications.

Disadvantages of typical hybrid architectures are that they are generally designed for a specific communication service (e.g., voiceband or specific xDSL variant) and expected line conditions. The use of a different xDSL variant, for example, or extraordinary line conditions requires a different hybrid.

SUMMARY OF THE INVENTION

A hybrid with a plurality of selectable hybrid input paths each having an associated hybrid input path filter is provided. The hybrid includes a plurality of selectable receive paths each having an associated receive path filter. The hybrid further includes a hybrid output. The selection of any filter is non-mutually exclusive to the concurrent selection of another filter.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
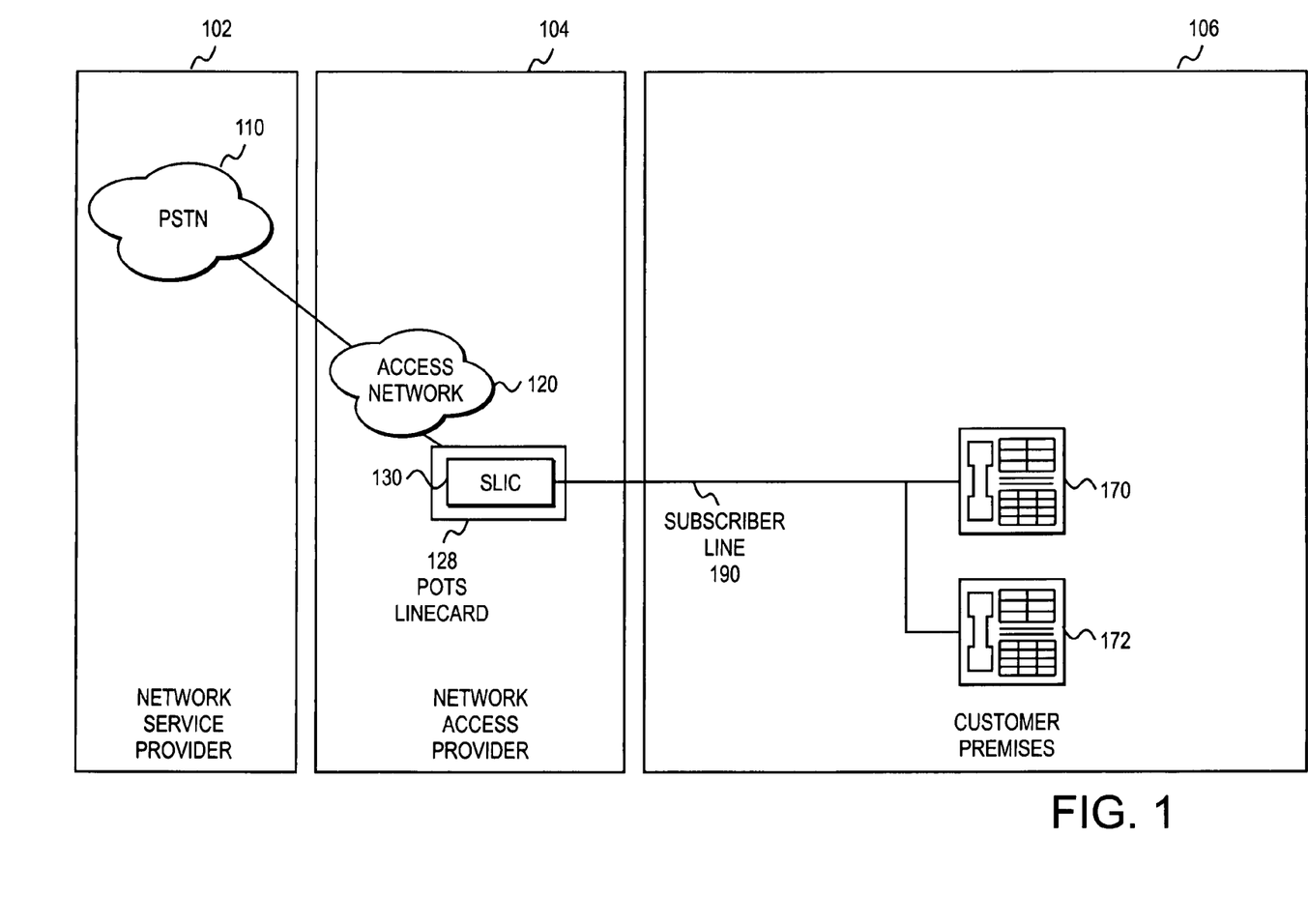
FIG. 1 illustrates one embodiment of a plain old telephone system (POTS) communication architecture.

FIG. 1 illustrates one embodiment of a prior art communications network model supporting voiceband communications associated with plain old telephone services (POTS) telephone system. The network model is divided into three physical domains: network service provider(s) 102, network access providers 104, and customer premises 106.

The network service providers (NSP) may have networks that span large geographic areas. Typically, however, the customer premises (CP) must be located within a specified distance of the network access provider (NAP) as a result of electrical specifications on the subscriber line 190. Thus network access providers typically have a number of central offices (CO) that support customers within a specified radius. Local exchange carriers (LEC) and competitive local exchange carriers (CLEC) are examples of network access providers.

In one embodiment, the network access provider is a telephone company. Subscriber equipment (i.e., customer premises equipment such as telephones 170, 172) is connected to a central office (CO) of the network access provider 104 via a subscriber line 190. For POTS systems, the subscriber line includes a tip line and a ring line that are typically implemented as an unshielded twisted copper wire pair.

The central office has numerous POTS linecards 128 for supporting multiple subscriber lines. Each linecard has at least one subscriber line interface circuit (SLIC) 130 that serves as an interface between a digital switching access network 120 of a local telephone company central office and the subscriber equipment 170, 172. In some embodiments, each linecard has a plurality of SLICs. The access network provides the SLIC and associated subscriber with access to the PSTN 110 for bi-directional communication with other subscribers similarly coupled to the PSTN.

Figure 2:
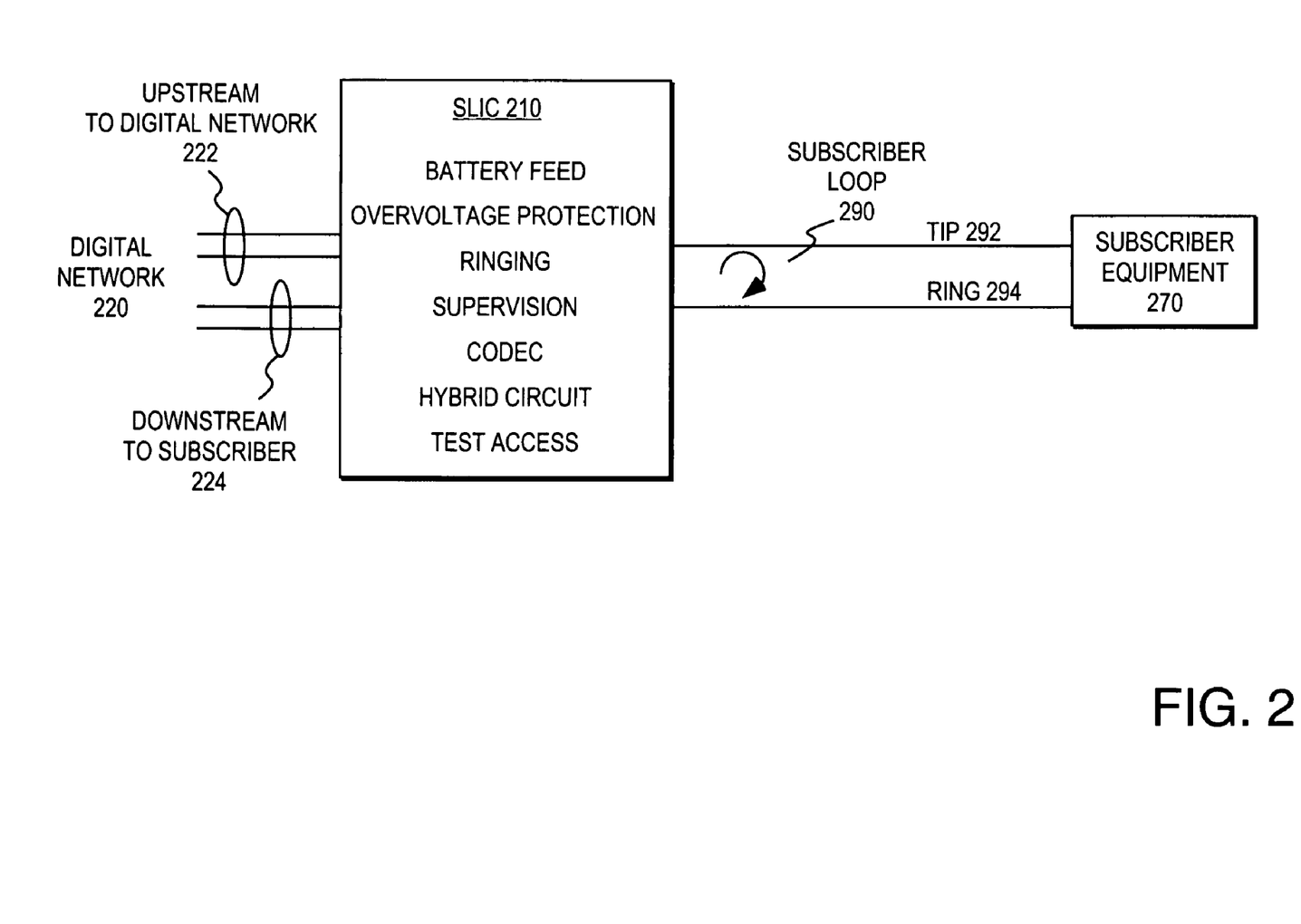
FIG. 2 illustrates one embodiment of a communication spectrum allocation for a subscriber line.

FIG. 2 illustrates one embodiment of a SLIC 210 coupled to subscriber equipment 270 by a tip line 292 and ring line 294. The tip line 292, subscriber equipment 270, and ring line 294 form a subscriber loop 290. The terms "subscriber line" and "subscriber loop" are frequently used interchangeably regardless of the presence or absence of the subscriber equipment. The POTS standards establish the electrical specifications and communication protocols for voiceband communications carried by the subscriber line.

The SLIC receives downstream digital voiceband data from digital network 220 (e.g., the PSTN) on a downstream data path 224 for conversion and communication to the subscriber equipment 270. The SLIC receives upstream analog voiceband data from subscriber equipment 270 for conversion and communication to the digital network 220 on upstream data path 222.

The SLIC is expected to perform a number of functions often collectively referred to as the BORSCHT requirements. BORSCHT is an acronym for "battery feed," "overvoltage protection," "ring," "supervision," "codec," "hybrid," and "test" (e.g., loop diagnostics).

Referring to FIG. 1, the SLIC provides power to the subscriber equipment 170, 172 using the battery feed function. The overvoltage protection function serves to protect the central office circuitry against voltage transients that may occur on the subscriber line 190. The ringing function enables the SLIC to signal the subscriber equipment 170, 172 (e.g., ringing a telephone).

The supervision function enables the SLIC to detect subscriber equipment service requests such as when the caller goes "off-hook". The supervision function is also used to supervise calls in progress and to detect dialing input signals.

The hybrid function provides a conversion from two-wire signaling to four-wire signaling. The transmit path (downstream to subscriber) and receive path (upstream from subscriber) share the same physical lines of the subscriber loop. Given that the upstream signal from the subscriber and the downstream signal from the SLIC share the same subscriber line for communication, the hybrid function typically performs some form of cancellation to remove the downstream signal from the sensed subscriber line in order to distinguish the upstream signal from other signals on the subscriber line.

The SLIC includes a codec to convert the upstream analog voiceband data signal into serial digital codes suitable for transmission by the digital switching network 110. In one embodiment, pulse code modulation is used to encode the voiceband data. The codec also converts the digital downstream voiceband data from serial digital codes to analog signals suitable for downstream transmission on the subscriber line to the subscriber equipment. The SLIC also typically provides a means to test for faults that may exist in the subscriber loop or within the SLIC itself.

Historically, the network access providers served to connect customers or subscribers to the PSTN for voiceband communications (communications having an analog bandwidth of approximately 4 khz or less). Although the PSTN is digital in nature, the connection (subscriber line 190) between the customer premises 106 and the network access provider 104 is analog.

The subscriber line may be provisioned for additional services by using communication bandwidth beyond the voiceband. Thus, for example, digital subscriber line services may simultaneously co-exist with voiceband communications by using communication bandwidth other than the voiceband. The choice of frequency ranges and line codes for these additional services is the subject of various standards. The International Telecommunication Union (ITU), for example, has set forth a series of recommendations for subscriber line data transmission. These recommendations are directed towards communications using the voiceband portion of the communications spectrum ("V.x" recommendations) as well as communications utilizing frequency spectrum other than the voiceband portion (e.g., "xDSL" recommendations).

Various examples of line code standards include quadrature amplitude and phase modulation, discrete multi-tone modulation, carrierless amplitude phase modulation, and two binary one quaternary (2B1Q).

Asymmetric digital subscriber line (ADSL) communications represent one variant of xDSL communications. Exemplary ADSL specifications are set forth in "Rec. G.992.1 (06/99)—Asymmetric digital subscriber line (ADSL) transceivers" (also referred to as full rate ADSL), and "Rec. G.992.2 (06/99)—Splitterless asymmetric digital subscriber line (ADSL) transceivers" (also referred to as G.LITE).

Figure 3:
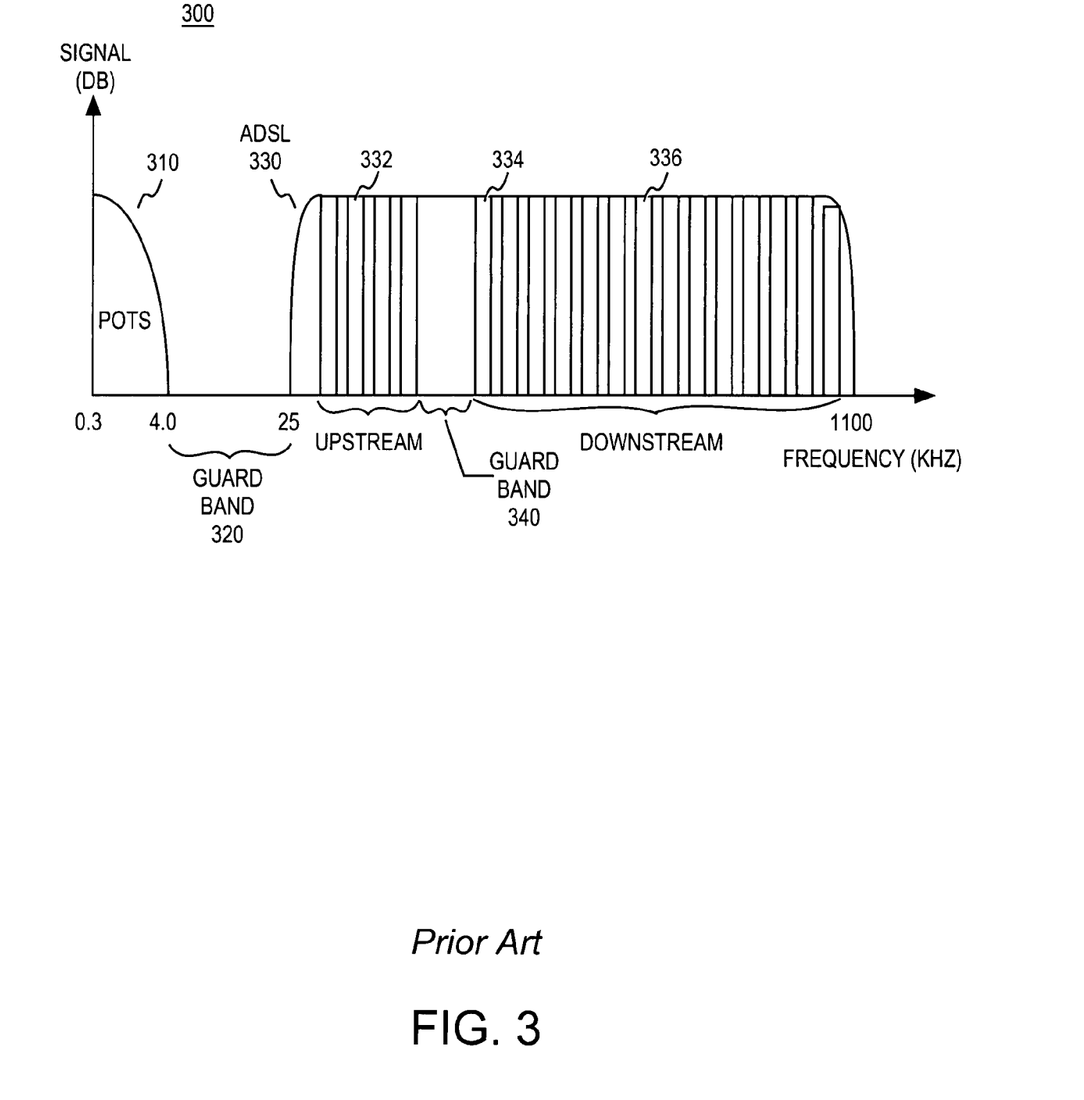
FIG. 3 illustrates one embodiment of prior art interface circuitry for supporting digital and voice data on the same subscriber line.

FIG. 3 illustrates one embodiment of communication spectrum allocation for a subscriber line. Chart 300 compares the portions of the analog channel for voiceband applications (POTS 310) as well as digital services (e.g., ADSL 330). POTS communications typically use the voiceband range of 300-4000 Hz. One xDSL variant uses frequencies beyond the voiceband in the range of approximately 25-1100 khz as indicated. A guard band 320 separates the POTS and ADSL ranges.

There are multiple line coding variations for xDSL. Carrierless Amplitude Phase (CAP) modulation and Discrete Multi-Tone (DMT) modulation both use the fundamental techniques of quadrature amplitude modulation (QAM). CAP is a single carrier protocol where the carrier is suppressed before transmission and reconstructed at the receiving end. DMT is a multicarrier protocol. FIG. 3 illustrates DMT line coding.

DMT modulation has been established as a standard line code for ADSL communication. The available ADSL bandwidth is divided into 256 sub-channels. Each sub-channel 334 is associated with a carrier. The carriers (also referred to as tones) are spaced 4.3125 Khz apart. Each sub-channel is modulated using quadrature amplitude modulation (QAM) and can carry 0-15 bits/Hz. The actual number of bits is allocated depending upon line conditions. Thus individual sub-channels may be carrying different numbers of bits/Hz. Some sub-channels 336 might not be used at all.

ADSL uses some sub-channels 334 for downstream communication and other sub-channels 332 for upstream communication. The upstream and downstream sub-channels may be separated by another guard band 340. ADSL is named for the asymmetry in bandwidth allocated to upstream compared to the bandwidth allocated to downstream communication.

During initialization the signal-to-noise ratio of each DMT sub-channel is measured to determine an appropriate data rate assignment. Generally, greater data rates (i.e., more bits/Hz) are assigned to the lower sub-channels because signals are attenuated more at higher frequencies. DMT implementations may also incorporate rate adaption to monitor the line conditions and dynamically change the data rate for sub-channels.

xDSL can be provisioned using the same subscriber line as that used for standard POTS communications thus leveraging existing infrastructure. The availability of xDSL technology permits delivery of additional services to the subscriber.

Figure 4:
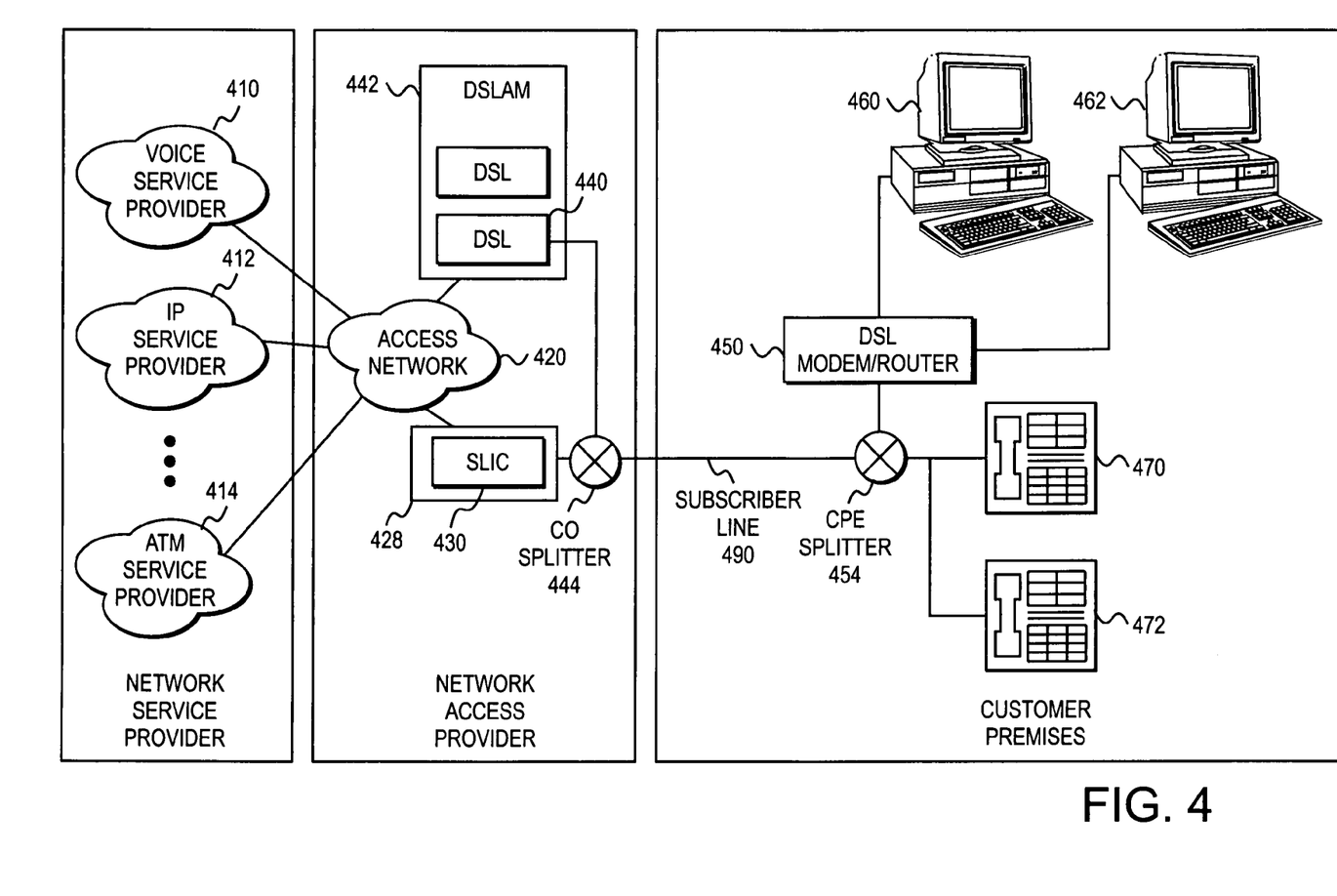
FIG. 4 illustrates one embodiment of a subscriber line interface circuit.

FIG. 4 illustrates an embodiment of a communications network model supporting voice and digital services (e.g., xDSL) on a common subscriber line 490. Various digital services may utilize different encoding algorithms (e.g., two binary one quaternary (2B1Q)). The POTS subscriber equipment such as telephones 470, 472 are connected to a POTS SLIC 430 residing on a POTS linecard 428 via subscriber line 490. The NAP access network 420 couples the POTS linecard to a voice service provider network 410 such as the PSTN.

A digital subscriber line access multiplexer (DSLAM) 442 has a plurality of DSL linecards 440. The access network 420 enables communication with digital network service providers such as Internet protocol (IP) service providers 412 and asynchronous transfer mode (ATM) service providers 414. A DSLAM linecard provides a connection from one of the digital networks via access network 420 to the subscriber line 490 through the use of a central office splitter 444.

The splitter 444 serves to route the appropriate portion of the analog channel of the subscriber line 490 to one of the DSL linecard 440 and the POTS linecard 428. In particular, the splitter filters out the digital portion of the subscriber line communications for the POTS linecard 428. The splitter filters out the voiceband communications for the DSL linecard 440. The splitter also protects the DSL linecard from the large transients and control signals associated with the POTS communications on the subscriber line.

The CO splitter thus effectively splits upstream communications from the subscriber equipment into at least two spectral ranges: voiceband and non-voiceband. The upstream voiceband range is provided to the POTS linecard and the upstream non-voiceband range is provided to the DSL linecard. The splitter couples the distinctly originating downstream voiceband and downstream non-voiceband communications to a common physical subscriber line 490.

A customer premises equipment splitter 454 may also be required at the customer premises for the POTS subscriber equipment 470, 472. The CPE splitter 454 passes only the voiceband portion of the subscriber line communications to the POTS subscriber equipment.

In one embodiment, the CPE splitter provides the DSL communications to a DSL modem 450 that serves as a communications interface for digital subscriber equipment such as computers 460, 462. In one embodiment, the DSL modem includes router functionality.

The DSL service overlays the existing POTS service on the same subscriber line. The splitters effectively separate the bi-directional voiceband communications and the xDSL communications from each other due to frequency band separation. The xDSL modem and the SLIC, however, still must differentiate upstream and downstream communications carried on the same wire pair. Thus both the SLIC and the xDSL modem require a hybrid circuit to provide transmit and receive path separation and echo cancellation.

Figure 5:
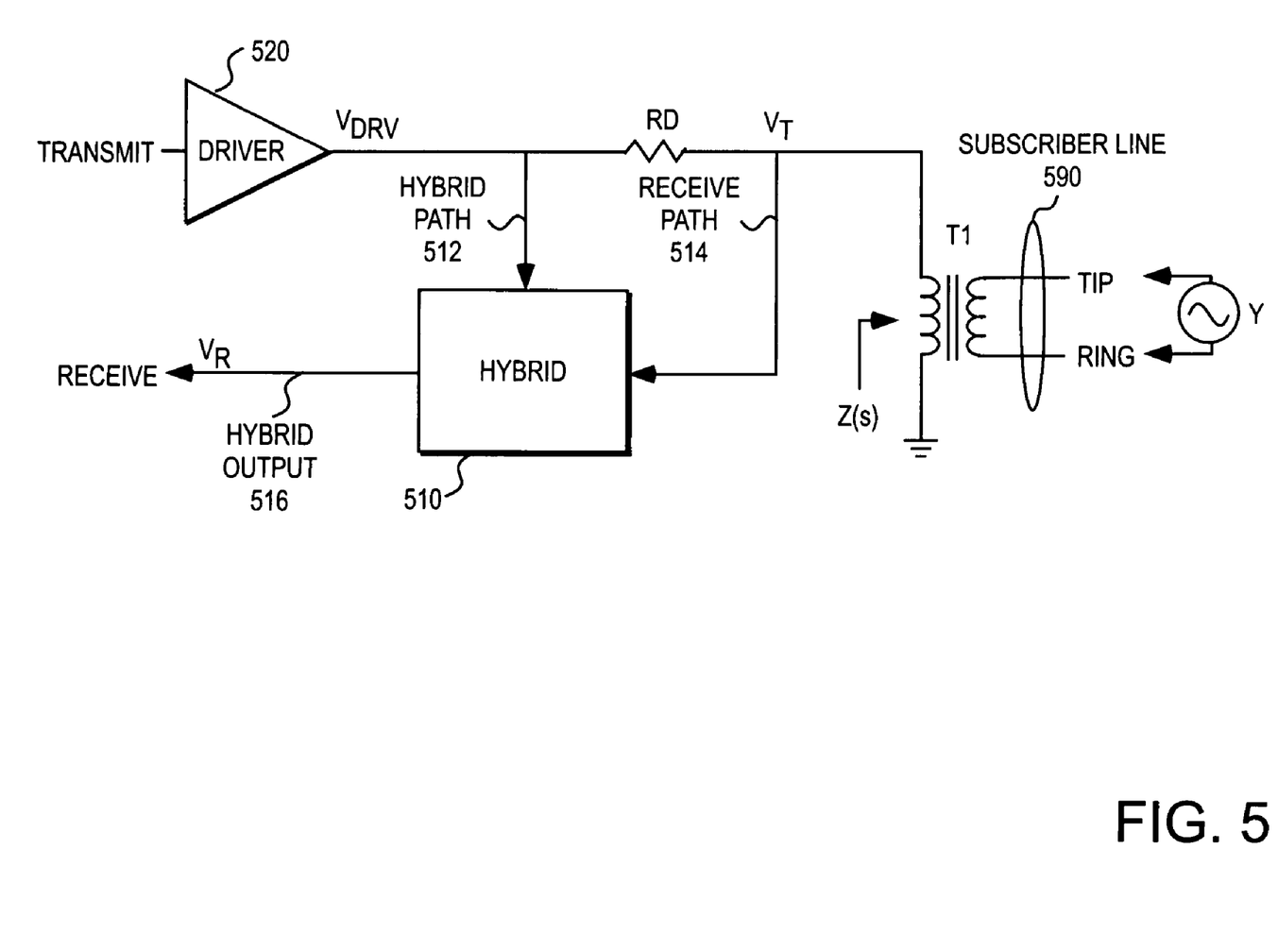
FIG. 5 illustrates an overview of a hybrid circuit.

FIG. 5 illustrates one hybrid implementation. The circuitry of FIG. 5 is illustrated as singled-ended (i.e., ground-referenced) for purposes of discussion, however, the separate transmit and receive paths typically utilize differential signaling in practice such that the hybrid effectively performs a 2-wire to 4-wire conversion.

The transmit path flows through driver 520 and driver output impedance $R_D$ to transformer T1. The receive path 514 flows from T1 through the hybrid 510. The output of the transmit driver 520 is also provided to the hybrid along a hybrid input path 512. Transformer T1 provides electrical isolation for coupling the transmit and receive paths to the subscriber line 590. The transmit and receive paths to the far end are merged together and share the same subscriber line 590.

Y represents the signal transmitted by the far end for receipt by the near end. Ideally the hybrid output 516 provides an output $V_R$ proportional to Y. $V_T$ however, has contributions from the superposition of $V_{DRV}$ and Y. In order to avoid near end echoes (i.e., the device's own transmitted signal appearing in the receive path), the hybrid should cancel contributions from $V_{DRV}$ to $V_R$. Typically, hybrids create a voltage division and use either an opposite phase winding of a transformer or active circuitry (e.g., operational amplifiers) to cancel the transmitted signal such that it does not appear in the hybrid output.

Figure 6:
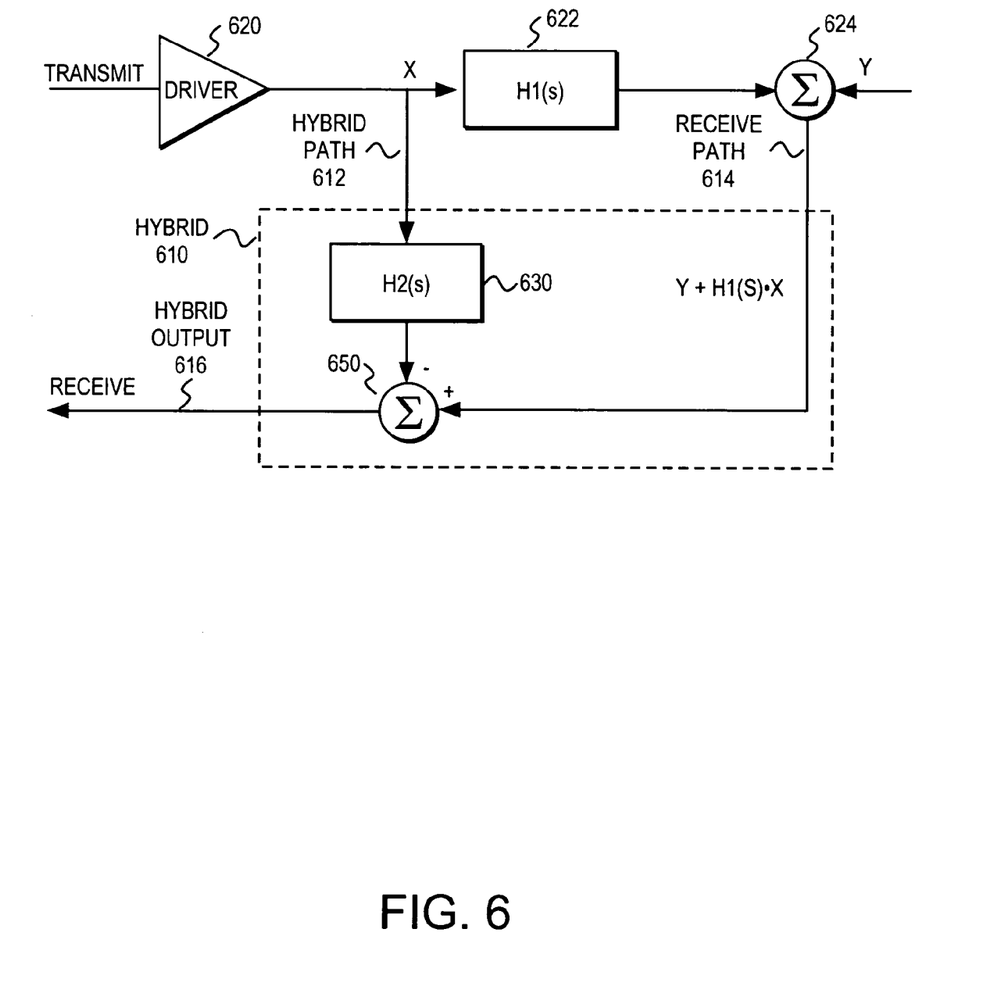
FIG. 6 illustrates one embodiment of a hybrid circuit.

FIG. 6 illustrates a system level view of a hybrid. Element 624 models the superposition of the signal X being transmitted and the desired receive signal Y as a result of sharing the same subscriber line. The hybrid 610 is designed in part to cancel the signal $V_{DRV}$ being transmitted onto the subscriber line so that the large transmit signal X is not re-introduced into the receive path provided by hybrid output 616.

The transmitted signal VDRV from driver 620 is distorted by the transformer T1 and line impedance in a manner modeled as H1(s) 622. Receive path 614 sees a superposition of the desired input signal Y and X·H1(s). The hybrid input path filter H2(s) 630 is designed to introduce the same distortion as H1(s) 622 on $V_{DRV}$. When combined by differential summer 650, the result is Y+X·H1(s)−X·H2(s). If H1(s)=H2(s), the hybrid effectively cancels the near end transmitted signal from the receive path 614 so that hybrid output 616 is the desired result, i.e., Y.

One disadvantage with this approach is that the desired receive signal, Y, is usually much smaller than X. Differential summer 650 is taking the difference of two larger values in order to identify a smaller value. This tends to introduce noise into the system. Another disadvantage for some applications is that H2(s) is a pole/zero filter that does not block DC. Furthermore, the pole and zero are difficult to adjust independently in practical implementations.

Figure 7:
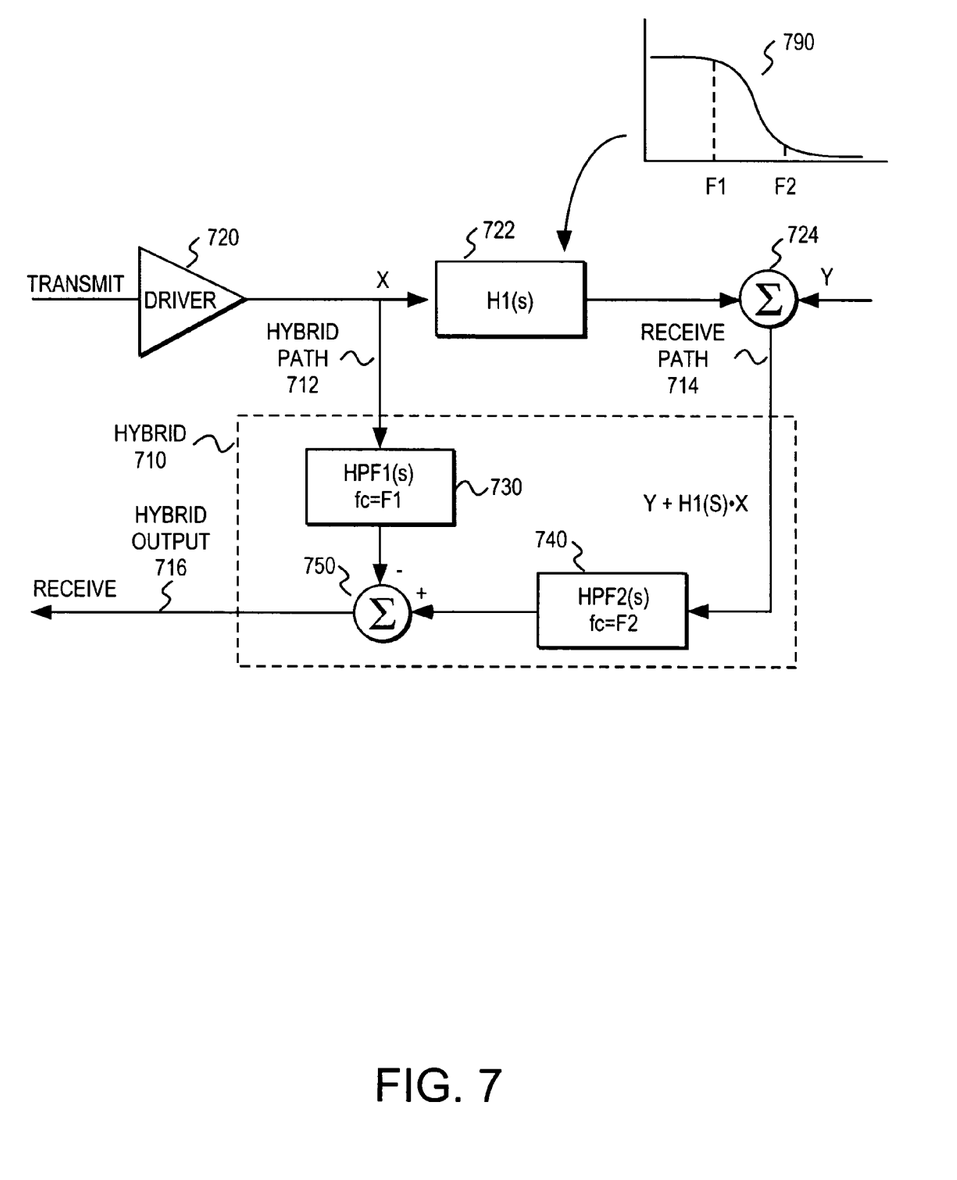
FIG. 7 illustrates another embodiment of a hybrid circuit.

FIG. 7 illustrates an alternative hybrid network. Hybrid 710 has a hybrid input path 712, a receive path 714 and a hybrid output 716. Transfer function H1(s) represents the distortion of the signal X transmitted by driver 720 as previously discussed. A graphical representation of a typical H1(s) is illustrated in chart 790. Element 724 represents the superposition of the transmitted signal and the signal Y appearing on the subscriber line. The receive path 714 receives the combined signal from the subscriber line as Y+H1(s)·X.

Instead of a hybrid having a single pole/zero filter, two high pass filters are used. One high pass filter HPF1(s) 730 having a corner frequency of F1 is provided in the hybrid input path 612 to produce HPF1(s)·X. A second high pass filter HPF2(s) 740 having a corner frequency of F2 is provided in the receive path 714 to produce HPF2(s)·Y+HPF2(s)·H1(s)·X. The corner frequency of filter 730 produces a pole that is used to offset a zero of filter 722 at the same frequency. HPF1(s) and HPF2(s) are selected so that HPF1(s)=H1(s)·HPF2(s).

The hybrid applies transfer function HPF2(s) to the signal Y+H1(s)·X to provide HPF2(s)·Y+H1(s)·HPF2(s)·X to differential summer 750. Hybrid 710 also applies a transfer function HPF1(s) to the signal X received at the hybrid path 712 and provides the result HPF1(s)·X to differential summer 750. The hybrid output from differential summer 750 is thus HPF2(s)·Y+H1(s)·HPF2(s)·X−HPF1(s)·X. If HPF1(s)=H1(s) HPF2(s), then the hybrid output reduces to HPF2(s)·Y.

One advantage of this approach is that filters 730 and 740 are the same type of filter and they are first order filters. Filters 730 and 740 may be realized, for example, with resistors and capacitors. The use high pass filters provides DC isolation and some rejection of the voiceband signal for DSL applications.

Figure 8:
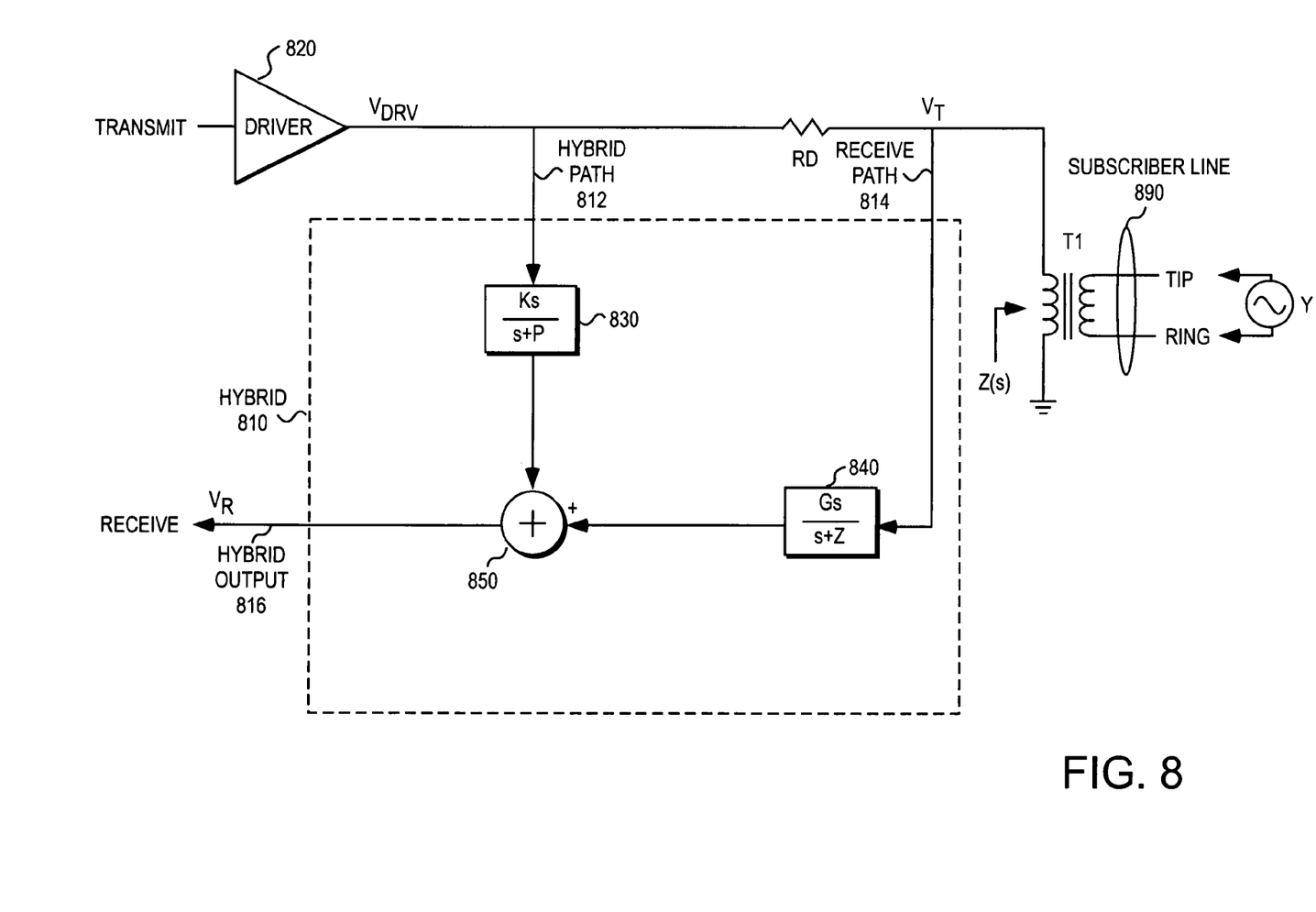
FIG. 8 illustrates one embodiment of a hybrid having a hybrid path filter and a receive path filter.

FIG. 8 illustrates a hybrid circuit with the high pass filters of FIG. 7. Driver 820 provides the transmitted signal $V_{DRV}$ through an output impedance RD that is coupled to the line transformer T1 for driving the subscriber line 890. Scaled versions of the drive signal, $V_{DRV}$ and the signal to be received (i.e., the signal transmitted from the far end of subscriber line 890), Y, are superimposed upon each other at transformer T1. The voltage across T1 is represented as $V_T$.

Hybrid 810 includes filter 830 having the transfer function $$\frac{Ks}{s+F1}$$

located in the hybrid input path 812. Filter 840 having the transfer function $$\frac{Gs}{s+F2}$$

is located in the receive path 814.

The transfer function H1(s) from the driver output to the receive path input is as follows:

$$H1(s) = \frac{Z(s)}{R_D + Z(s)}$$

The transfer function from the driver output to the hybrid input path is as follows:

$$HPF1(s) = \frac{K_1 s}{s+F1}$$

The transfer function from the receive path input is as follows:

$$HPF2(s) = \frac{G_1 s}{s+F2}$$

The voltage at the transformer T1 is the result of superposition of the driver voltage and the far end transmitted signal contributions as follows:

$$V_T = \left(V_{DRV}\left(\frac{Z(s)}{R_D+Z(s)}\right) + Y\right)$$

So differential summer 850 provides the following at the hybrid output 816:

$$V_R = V_{DRV}\left(\frac{Z(s)}{R_D+Z(s)}\right) \cdot \frac{G_1 s}{s+F2} + Y \cdot \frac{G_1 s}{s+F2} - V_{DRV}\left(\frac{K_1 s}{s+F1}\right)$$

The transformer can be modeled as a series coupled capacitor (Cx) and resistor (Rx) so that VR can be expressed as follows:

$$V_R = V_{DRV}\left[\frac{1+sC_X R_X}{1+sC_X(R_D+R_X)} \cdot \frac{G_1 s}{s+F2} - \frac{K_1 s}{s+F1}\right] + Y \cdot \frac{G_1 s}{s+F2}$$

In order to eliminate $V_{DRV}$ from the hybrid output, the pole (s+F2) of the receive path filter is adjusted to eliminate the zero defined by $(1+sC_X R_X)$. The gain K1 and pole (s+F1) are then adjusted to eliminate the remainder of the $V_{DRV}$ contribution. RD has been analyzed as if a single-ended circuit is used. In the event that a differential circuit is used, RD refers to the sum of the output impedances associated with the differential driver outputs.

Unfortunately, the approach of FIGS. 7-8 may not be suitable for some applications. High pass filter 740 may be unsuitable for applications that have a lot of low frequency components because filter 740 attenuates Y at lower frequencies. In addition, H1(s) has been modeled with a single pole/zero response. If the transfer function H1(s) is of greater complexity, filters 730, 740 will not be able to achieve the desired cancellation of X from the receive path.

Figure 9:
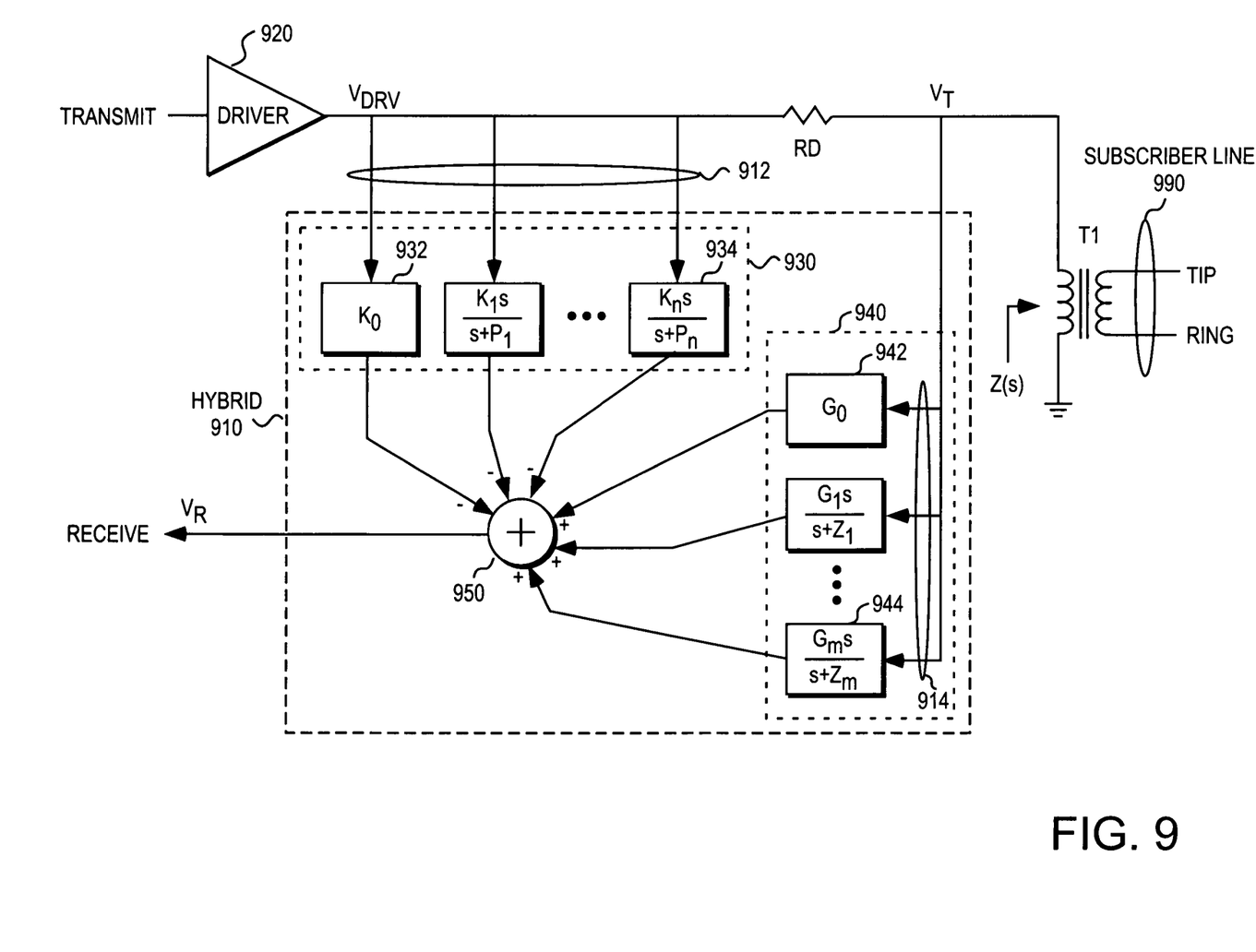
FIG. 9 illustrates one embodiment of a hybrid having a plurality of selectable hybrid and receive paths, each associated with a filter.

FIG. 9 illustrates one embodiment of a generalized hybrid having multiple selectable filters 930, 940 for the hybrid input 912 and the hybrid receive path 914. Effectively the hybrid 910 has a plurality of selectable hybrid input paths each associated with a filter 932-934. Similarly, hybrid 910 has a plurality of selectable receive paths associated with a filter 942-944. In the illustrated embodiment, the hybrid input path includes at least one selectable DC path (filter 932) and the hybrid receive path includes at least one selectable DC path (filter 944).

The selection of any hybrid input path filter is not mutually exclusive of the selection of any other hybrid input path filter. Similarly, the selection of any receive path filter is not mutually exclusive of the selection of any other receive path filter.

Through the selection of one or more filters of the hybrid input path and the receive path, the generalized hybrid has the capability of realizing a wide range of transfer functions including higher order transfer functions.

In the illustrated embodiment, each selectable filter for the hybrid input path is of the form $$\frac{K_i s}{s+P_i},$$

with the exception of the DC filter ($K_0$). Accordingly the resulting hybrid input path filter takes the form $$K_0 + \frac{K_1 s}{s+P_1} + \frac{K_2 s}{s+P_2} + \frac{K_3 s}{s+P_3} \cdots \frac{K_n s}{s+P_n}$$

where the gain coefficients $K_i \ldots K_n$ may be any real number for any integer i where $i \in \{0, 1, \ldots, n\}$. In the event that the gain coefficients are variable, a value of 0 for any $K_i$ indicates that the path associated with that filter is not selected.

Similarly, with the exception of the DC filter ($G_0$), each selectable filter for the hybrid receive path 914 is of the form $$\frac{G_j s}{s+Z_j}.$$

Accordingly the resulting hybrid input path filter takes the form $$G_0 + \frac{G_1 s}{s+Z_1} + \frac{G_2 s}{s+Z_2} + \frac{G_3 s}{s+Z_3} \cdots \frac{G_m s}{s+Z_m}$$

where the gain coefficients $G_j$ may be any real number for any integer j where $j \in \{0, 1, \ldots, m\}$. A value of 0 for any variable $G_j$ indicates that the path associated with that filter is not selected.

The $G_j$ and $K_i$ may be appropriately selected to provide a near end transmitted signal ($V_{DRV}$) from driver 920 to received signal ($V_R$) transfer function of approximately zero such that $$\frac{V_{DRV}}{V_R} \approx 0$$

at least within a frequency range of interest. In one embodiment, $G_j$ and $K_i$ are selected to provide a far end transmitted signal (Y, originating from the far end of subscriber line 990) to received signal ($V_R$) transfer function of approximately 1 such that $$\frac{Y}{V_R} \approx 1.$$

The generalized multiple path hybrid may be fabricated on an integrated circuit die 910. In one embodiment, the multiple path hybrid is fabricated on an integrated circuit die using complementary metal oxide semiconductor (CMOS) fabrication processes. The integrated circuit die is then packaged within an integrated circuit package such that the multiple path hybrid may be distributed as an integrated circuit.

Figure 10:
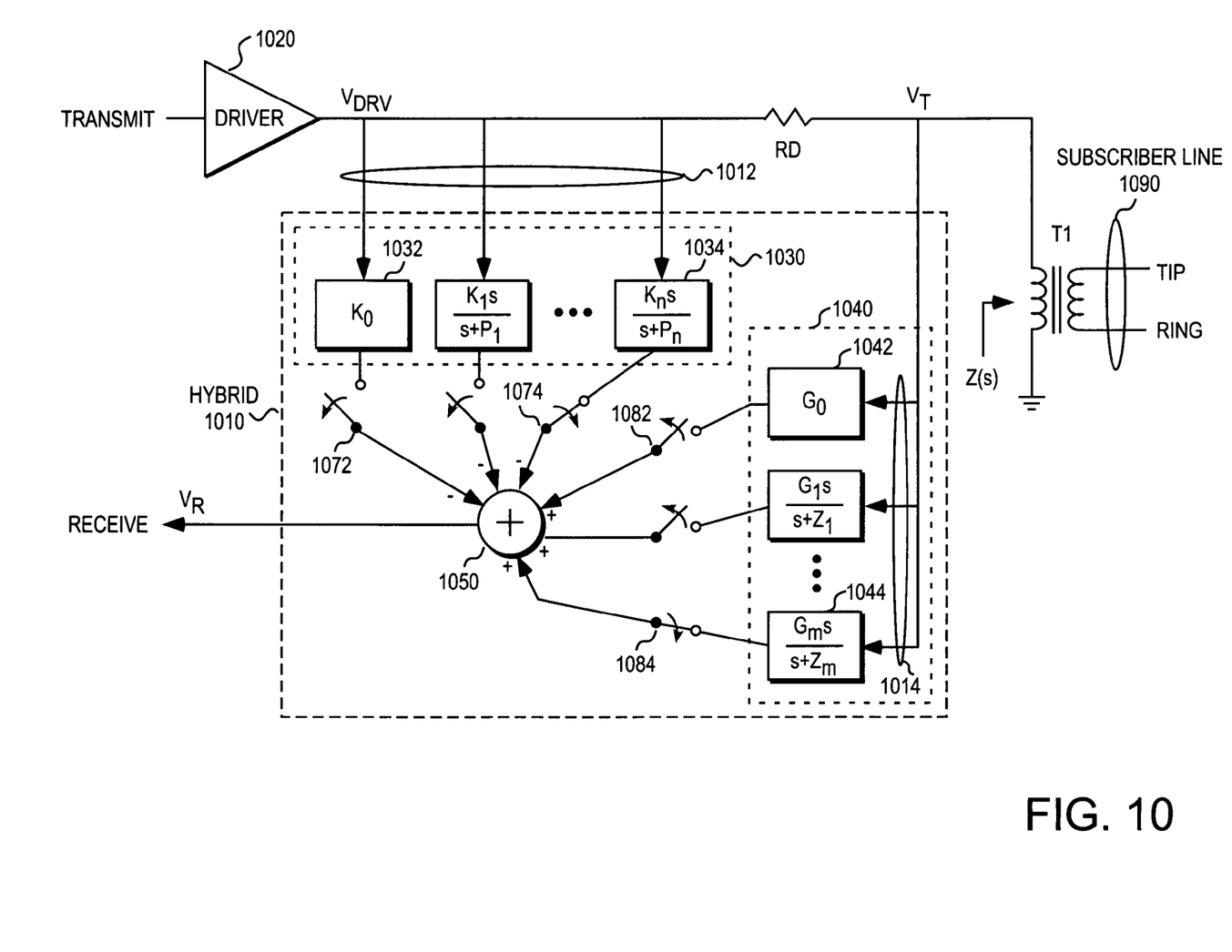
FIG. 10 illustrates a hybrid having at least one selected hybrid path and one receive path selected from a plurality of hybrid and receive paths.

FIG. 10 illustrates a hybrid 1010 coupled to a driver 1020 and the subscriber line 1090. The hybrid has at least one hybrid path 1034 and at least one receive path 1044 selected from a plurality of hybrid input paths 1012 and a plurality of receive paths 1014, respectively. In this embodiment switches 1072-1074 are provided for selectively coupling an associated hybrid input path to differential summer 1050. Each individual hybrid input path is associated with a filter 1032-1034 (collectively, filters 1030). The aggregate hybrid input path is the weighted sum of the individual hybrid paths. The hybrid input path filters represent the weights associated with each selected hybrid input path. The weight of any non-selected path is zero.

Similarly, switches 1082-1084 are provided for selectively coupling an associated receive path to differential summer 1050. Each individual receive path is associated with a filter 1042-1044 (collectively, filters 1040). The aggregate receive path is the weighted sum of the individual receive paths. The hybrid receive path filters represent the weights associated with each selected receive path. The weight of any non-selected path is zero.

In one embodiment, the gain coefficients are invariant or fixed. In an alternative embodiment, the gain coefficients are variable, however, switches 1072-1074, 1082-1084 are used for selecting/de-selecting a given hybrid input path or receive path independently of the value of the associated gain coefficient in either embodiment.

For example, the hybrid illustrated in FIG. 8 may be realized by selecting a hybrid input path filter having the proper pole/zero combination and de-selecting all other hybrid input path filters. Assuming $P_n$=F1, switch 1074 is closed to select filter 1034. The remaining switches (e.g., 1072) are opened to exclude the other filters.

Similarly, assuming $Z_m$=F2, switch 1084 is closed to select filter 1044 and the remaining switches (e.g., 1082) are opened to exclude the other filters. In the illustrated embodiment, the plurality of receive paths include at least one selectable DC path. Likewise, the plurality of hybrid input paths includes at least one selectable DC path.

Use of the multiple path hybrid is not limited to DSL subscriber line services. Filters other than DC or high pass filters may be used in the receive or the hybrid input paths or both depending upon the application. Other subscriber line services applications include voiceband processing, xDSL variants, or other communication services utilizing the subscriber line that requires transmit and receive path separation.

Thus a multiple path hybrid having a plurality of selectable hybrid input paths and a plurality of selectable receive paths has been described. The hybrid input paths are neither mutually exclusive nor dependent from each other. Thus any combination of the hybrid input paths may be concurrently selected. The receive paths are also not mutually exclusive nor dependent from each other. Thus any combination of the receive paths may be concurrently selected. In various embodiments at least one filter of the set comprising hybrid input path filters and receive path filters provides a DC path.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:
a hybrid having a plurality of selectable hybrid input paths each having an associated hybrid input path filter, a plurality of selectable receive paths each having an associated receive path filter, and a hybrid output, wherein at least one filter of the set comprising the plurality of hybrid input path filters and the plurality of receive path filters provides a DC path, wherein for at least one of the pluralities of selectable hybrid input paths and selectable receive paths the selection of any path of that plurality is not mutually exclusive to the concurrent selection of any other path of that plurality.

2. The apparatus of claim 1 wherein the at least one DC path filter is associated with one of the selectable receive paths.

3. The apparatus of claim 1 wherein the at least one DC path filter is associated with one of the selectable hybrid input paths.

4. The apparatus of claim 1 wherein at least one filter of the set has a variable gain co-efficient.

5. The apparatus of claim 1 wherein at least one filter of the set has a fixed gain co-efficient.

6. The apparatus of claim 1 wherein any filter of the set is selected by adjusting a filter gain co-efficient for that filter.

7. The apparatus of claim 1 wherein at least one filter of the set is switchably selected independently of a value of its filter gain coefficient.

8. The apparatus of claim 1 wherein at least one of the plurality of hybrid input path filters has a transfer function of the form $K_0$ wherein $K_0$ is a frequency independent value.

9. The apparatus of claim 1 wherein at least one of the plurality of hybrid input path filters has a transfer function of the form $$\frac{K_i s}{s+P_i}.$$

10. The apparatus of claim 1 wherein at least one of the plurality of receive path filters has a transfer function of the form $G_0$ wherein $G_0$ is a frequency independent value.

11. The apparatus of claim 1 wherein at least one of the plurality of receive path filters has a transfer function of the form $$\frac{G_j s}{s+Z_j}.$$

12. The apparatus of claim 1 wherein the selection of any hybrid input path is not mutually exclusive of the selection of any other hybrid input path.

13. The apparatus of claim 1 wherein the selection of any receive path is not mutually exclusive of the selection of any other receive path.

14. The apparatus of claim 1 wherein the hybrid further comprises:
 a differential summer combining the selected receive paths and the selected hybrid input paths to generate the hybrid output.

15. The apparatus of claim 1 providing a near end transmitted signal ($V_{DR}$) to received signal ($V_R$) transfer function of approximately zero such that $$\frac{V_{DR}}{V_R} \approx 0$$

at least within a frequency range of interest.

16. The apparatus of claim 1 providing a far end transmitted signal (Y) to received signal ($V_R$) transfer function of approximately 1 such that $$\frac{Y}{V_R} \approx 1.$$

17. The apparatus of claim 1 wherein the hybrid resides on an integrated circuit die.

18. An apparatus comprising:
 a hybrid having a plurality of selectable hybrid input paths each having an associated hybrid input path filter, a plurality of selectable receive paths each having an associated receive path filter, and a hybrid output, wherein for at least one of the pluralities of selectable hybrid input paths and selectable receive paths the selection of any path of that plurality is not mutually exclusive to the concurrent selection of any other path of that plurality.

19. The apparatus of claim 18 wherein at least one filter of the set comprising the plurality of hybrid input path filters and the plurality of receive path filters provides a DC path.

20. The apparatus of claim 18 wherein at least one filter of the set has a variable gain co-efficient.

21. The apparatus of claim 18 wherein at least one filter of the set has a fixed gain co-efficient.

22. The apparatus of claim 18 wherein any filter of the set is selected by adjusting a filter gain co-efficient for that filter.

23. The apparatus of claim 18 wherein at least one filter of the set is switchably selected independently of a value of its filter gain coefficient.

24. The apparatus of claim 18 wherein at least one of the plurality of hybrid input path filters has a transfer function of the form $K_0$ wherein $K_0$ is a frequency independent value.

25. The apparatus of claim 18 wherein at least one of the plurality of hybrid input path filters has a transfer function of the form $$\frac{K_i s}{s+P_i}.$$

26. The apparatus of claim 18 wherein at least one of the plurality of receive path filters has a transfer function of the form $G_0$ wherein $G_0$ is a frequency independent value.

27. The apparatus of claim 18 wherein at least one of the plurality of receive path filters has a transfer function of the form $$\frac{G_j s}{s+Z_j}.$$

28. The apparatus of claim 18 wherein the selection of any hybrid input path is not mutually exclusive of the selection of any other hybrid input path.

29. The apparatus of claim 18 wherein the selection of any receive path is not mutually exclusive of the selection of any other receive path.

* * * * *